Patented Nov. 5, 1946

2,410,793

UNITED STATES PATENT OFFICE 2,410,793

SULFONAMIDO PYRIMIDINES

Philip Stanley Winnek and Richard O. Roblin, Jr., Stamford, Conn., assignors to American Cyanamid Company, New York, N. Y., a corporation of Maine No Drawing. Application March 1, 1940, Serial No. 321,666

4 Claims. (Cl. 260—239.6)

This invention relates to a new class of chemical compounds, the unsubstituted 2-sulfanilamido pyrimidines.

The compounds of the present invention may be represented by the following type formula:

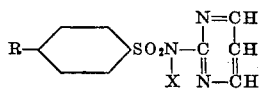

in which R is selected from the group consisting of $NH_2$ and radicals hydrolyzable to $NH_2$, and X is selected from the group consisting of hydrogen, alkyls and metals.

The compounds of the present invention are useful in a number of fields. Many of them show extraordinarily high activity against certain bacteria such as for example beta-hemolytic streptococci and pneumococci. The unsubstituted amino compounds are useful as intermediates for the production of azo dyes and other compounds.

In general the compounds of the present invention may be prepared by reacting an N-acyl sulfanilyl halide with 2-amino pyrimidine producing first the acylamino compound which can be transformed into the amino compound by hydrolysis of the acyl group. A second method is to start with a p-nitrobenzene sulfonyl halide and produce in the first step the corresponding p-nitrobenzene sulfonamido pyrimidine, followed by reduction of the nitro group if the amino group is desired. Another possibility is from a p-halogen benzene sulfonyl halide, for example, p-chlorobenzene sulfonyl chloride. The p-chlorobenzene sulfonamido pyrimidine may then be converted to the corresponding sulfanilamidopyrimidine by treatment with aqueous ammonia under pressure. Still another possibility is to start with a p-azobenzene sulfonyl halide and an aminopyrimidine followed by reduction of the azo group to an amino group. Still other possibilities of obtaining the amino group will be apparent to anyone skilled in the art.

In some cases the sulfanilamido pyrimidines may be prepared by the action of a halogen substituted pyrimidine on an $N^4$-acylsulfanilamide in the presence of an alkali such as, for example, potassium carbonate. The sulfanilamidopyrimidine is then obtained by hydrolysis of the acyl group.

The sodium formaldehyde sulfoxylate amino compound and the mono-aldose amino compounds are prepared from the amino compound by a reaction with the alkali metal sulfoxylate solution or a mono-aldose sugar such as glucose or galactose as the case may be. In the production of the sugar derivatives it is preferable, although not essential to carry out the reaction in an organic solvent such as ethanol.

The first step in producing any of the compounds of the present invention usually involves a reaction of a sulfanilyl halide with the corresponding 2-aminopyrimidine. This sets free a hydrogen halide and it is therefore desirable where a good yield is to be obtained, to provide a basic substance which will unite with the hydrogen halide evolved. This can be effected simply by carrying out the reaction in aqueous solution and adding a suitable amount of sodium hydroxide, or the reaction may be effected in an organic liquid such as dioxane, acetone, benzene and the like. Some organic solvents such as triethyl amine and pyridine are themselves basic, and may be used. In such cases, however, the compound of the organic base with the halogen acid is somewhat acidic and if desired a more neutral reaction mixture may be obtained by the addition of a stronger base such as caustic alkali.

The hydrogen of the sulfonamido group is an acidic hydrogen and is capable of reacting with strong bases to form salts. The alkali metal salts can be produced directly by a reaction of the compounds with an alkali metal hydroxide in concentrated aqueous solution. Warming on a steam bath is advantageous in bringing about salt formation. The salt can then be crystallized out on cooling, or if desired, crystallization from absolute alcohol can be effected. Salts of the heavy metals such as gold, copper, iron, and the like, can be obtained by a reaction of an aqueous solution of the alkali metal salts with a solution of the desired heavy metal salt. The salts of the heavy metals are either insoluble or have such a low degree of solubility that they readily precipitate out of solution.

The invention will be described in greater detail in conjunction with the following specific examples which set forth the preparation of typical compounds falling under the present invention. The parts are by weight except in the case of liquids which are expressed in corresponding parts by volume.

Example 1

2-(p-nitrobenzenesulfonamido)-pyrimidine

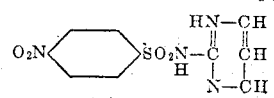

5.4 parts of 2-amino-pyrimidine were covered with 15 parts of anhydrous pyridine. The reaction mixture was treated with 14 parts of p-nitrobenzenesulfonyl chloride and the whole heated briefly on the steam bath and let stand 45 minutes at room temperature. To the reaction mixture were added 80 parts of hot alcohol and the precipitate was filtered off and washed with water. The solid was dissolved in dilute caustic solution and the solution was filtered, cooled and acidified. The 2-(p-nitrobenzenesulfonamido)-pyrimidine precipitated and was collected.

EXAMPLE 2

2-(sulfanilamido)-pyrimidine

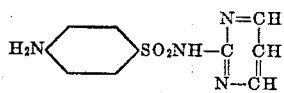

The crude 2-(p-nitrobenzenesulfonamido)-pyrimidine from the preceding example was suspended in 130 parts alcohol and 1.5 parts of concentrated hydrochloric acid were added. The suspension was then heated to reflux and 30 parts of iron powder were added with mechanical stirring. The mixture was refluxed and stirred for 24 hours with occasional addition of concentrated hydrochloric acid. The reaction mixture was then made slightly basic and filtered hot and the residues were extracted with several portions of boiling alcohol. The filtrate and wash solutions were combined and evaporated. The 2-(sulfanilamido)-pyrimidine was recrystallized from boiling water with decolorizing charcoal added.

EXAMPLE 3

2-($N^4$-acetylsulfanilamido)-pyrimidine

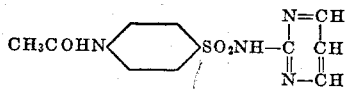

20 parts of 2-aminopyrimidine were partially dissolved and partially suspended in 45 parts of anhydrous pyridine. 47 parts of $N^4$-acetylsulfanilyl chloride were added gradually with vigorous stirring. The reaction mixture was heated on a steam bath 1 hour. It was then cooled and diluted with 750 parts of water containing 9 parts of sodium hydroxide. The crude 2-($N^4$-acetylsulfanilamido)-pyrimidine separated as a brown solid. It was filtered off and washed with water.

EXAMPLE 4

2-sulfanilamido-pyrimidine

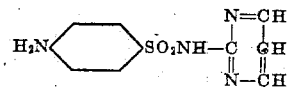

15 parts of 2-($N^4$-acetylsulfanilamido)-pyrimidine were dissolved in 150 parts of water containing 17.5 parts of sodium hydroxide and the solution boiled gently for 25 minutes. A small amount of decolorizing charcoal was added and the boiling was continued for 5 minutes. The solution was then filtered, cooled and neutralized with dilute hydrochloric acid. The crude 2-sulfanilamido-pyrimidine separated as a light brown solid. It was purified by crystallization from water using decolorizing charcoal to remove color. The pure 2-sulfanilamido-pyrimidine was identical with that prepared in Example 2. The hydrolysis of the 2-($N^4$-acetylsulfanilamido)-pyrimidine also can be carried out using 10% hydrochloric acid as hydrolyzing agent.

EXAMPLE 5

Azobenzene-p,p'-(di-2-sulfonamidopyrimidine)

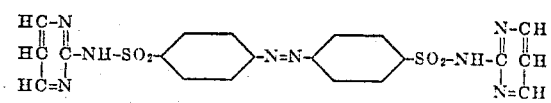

To 9.5 parts of 2-aminopyrimidine in 65 parts of dry pyridine was added 20 parts of azobenzene-p,p'-disulfonyl chloride. When the reaction was completed, the reaction mixture was added to 300 parts of water. The precipitated azobenzene-p,p'-(di-2-sulfonamidopyrimidine) was removed by filtration and washed with water. For purification it was dissolved in alkali and reprecipitated with acid. By reduction with sodium hydrosulfite in alkaline solution, 2-sulfanilamidopyrimidine was obtained.

EXAMPLE 6

4'-(N-(2 pyrimidyl) sulfonamido)-2-azo-7-acetylamino, 1-hydroxy naphthalene 3,6-disulfonic acid

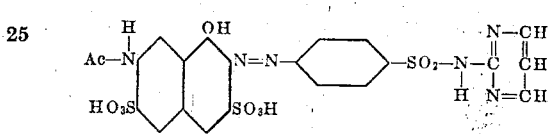

Twenty five parts of 2-sulfanilamido pyrimidine was dissolved in 25 parts of concentrated hydrochloric acid diazotized with a solution of 6.9 parts of sodium nitrite in water solution. The diazo solution was added to a strong carbonate solution of 36 parts of 7-acetylamino 1-hydroxy naphthalene 3,6,disulfonic acid. After several hours stirring, the solution was acidified with acetic acid and precipitated with salt.

The orange precipitate of 4'-(N-(2-pyrimidyl) sulfonamido)-2-azo-7-acetylamino 1-hydroxy naphthalene 3,6 disulfonic acid may be recrystallized from methanol. The water soluble sodium salt may be precipitated from aqueous solution by the addition of absolute alcohol.

EXAMPLE 7

Sodium salt of 2-sulfanilamido pyrimidine

The sodium salt is prepared by adding 2-sulfanilamido pyrimidine to the equivalent amount of sodium hydroxide dissolved in a very small volume of water. The mixture is warmed on a steam bath until solution is complete. Absolute alcohol and ether are then added and the sodium salt is precipitated as a white crystalline product. It is readily soluble in water.

Other alkali metal salts can be prepared in a similar manner by using the appropriate alkaline hydroxide.

EXAMPLE 8

Copper salt of 2-sulfanilamido pyrimidine

The copper salt of 2-sulfanilamido pyrimidine is prepared by adding slowly with stirring an aqueous solution of the sodium salt of 2-sulfanilamido pyrimidine to a solution containing an equivalent amount of copper chloride. The copper salt of 2-sulfanilamido pyrimidine separates as a solid.

Salts of other heavy metals, as for example, the gold, lead and iron salts are formed by reacting the sodium salt of 2-sulfanilamido pyrimidine in aqueous solution with a suitable soluble salt of the metal desired. The desired product is obtained usually as a precipitate.

EXAMPLE 9

*2-N¹-methyl sulfanilamidopyrimidine*

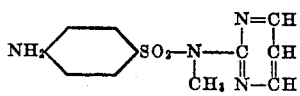

Four parts of 2-methylaminopyrimidine were added to 10 parts of anhydrous pyridine. To this were added 9 parts of p-nitrobenzene sulfonyl chloride. The resulting mixture was stirred well and warmed on the steam bath. When the reaction mixture had cooled, it was added to 150 parts of water. The precipitate of 2-p-nitrobenzene-sulfonamido methylpyrimidine was separated and recrystallized from glacial acetic acid. The 2-N¹-methyl sulfanilamidopyrimidine was obtained by reduction of the nitro group as described in Example 2. It was recrystallized from ethanol with the addition of decolorizing charcoal.

In the example where an acylamino compound was prepared, the acetylamino derivative is described because this is the cheapest and simplest acyl compound available. The invention, however, is not limited to any particular acyl derivative, but any other such as propionyl, butyryl, and the like, can be prepared.

The mono-aldose derivatives of the amino compounds of the present invention are in most instances water-soluble. These compounds may be prepared by refluxing compounds containing free amino groups with a mono-aldose sugar such as glucose or galactose in ethanol. The materials gradually go into solution and on cooling the alcoholic solutions the sugar derivatives crystallize out.

The complex resulting from the reaction of 2-sulfanilamido pyrimidine and glucose, for example, may be a compound of the anil or Schiff base type having the probable formula:

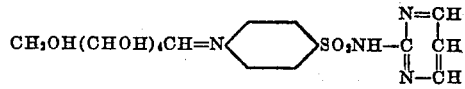

or it may be a compound having the probable formula:

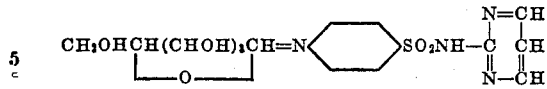

or it may be a mixture of the two types in equilibrium.

The 2-sulfanilamido pyrimidine described in the above examples is of high purity and is suitable for therapeutic application in infections involving bacteria.

We do not claim in this application specifically the sulfonamido-5-pyrimidines, these being specifically claimed in our copending application Serial No. 361,256, filed October 15, 1940.

We claim:

1. A sulfanilamido pyrimidine having the following formula:

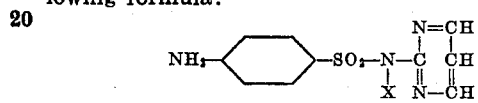

in which X represents a member of the group consisting of hydrogen, alkyls and metals.

2. A product according to claim 1 in which X is an alkali metal.

3. The compound 2-sulfanilamido pyrimidine of the formula:

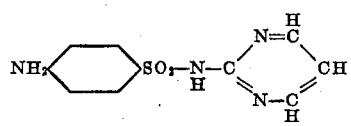

4. A p-substituted benzene sulfonamido pyrimidine compound having the following formula:

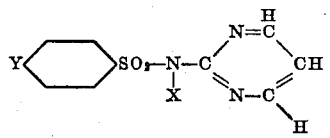

in which X is a positive radical and Y is a radical hydrolyzable to $NH_2-$.

PHILIP STANLEY WINNEK.
RICHARD O. ROBLIN, Jr.